US012474026B2

(12) United States Patent
Park et al.

(10) Patent No.: US 12,474,026 B2
(45) Date of Patent: Nov. 18, 2025

(54) ILLUMINATION DEVICE FOR A VEHICLE HEADLAMP

(71) Applicant: ZKW Group GmbH, Wieselburg (AT)

(72) Inventors: Sunjung Park, Seoul (KR); Bernhard Mandl, Seoul (KR); Benedikt Krist, Vienna (AT); Jakob Pühringer, Vienna (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/702,051

(22) PCT Filed: Oct. 12, 2022

(86) PCT No.: PCT/EP2022/078396
§ 371 (c)(1),
(2) Date: Apr. 17, 2024

(87) PCT Pub. No.: WO2023/066756
PCT Pub. Date: Apr. 27, 2023

(65) Prior Publication Data

US 2025/0237365 A1 Jul. 24, 2025

(30) Foreign Application Priority Data

Oct. 22, 2021 (EP) .................................... 21204189

(51) Int. Cl.
*F21S 41/25* (2018.01)
*F21S 41/147* (2018.01)
(Continued)

(52) U.S. Cl.
CPC ............. *F21S 41/25* (2018.01); *F21S 41/147* (2018.01); *F21S 41/151* (2018.01); *F21S 41/24* (2018.01);
(Continued)

(58) Field of Classification Search
CPC .......... F21S 41/24; F21S 41/14; F21S 41/151; F21S 41/28; F21S 41/285; F21S 41/322;
(Continued)

(56) References Cited

U.S. PATENT DOCUMENTS 10,663,131 B1 * 5/2020 Zhu ....................... F21S 41/143
10,753,562 B1 8/2020 Alisafaee
(Continued)

FOREIGN PATENT DOCUMENTS

JP 2015185533 A 10/2015
KR 20190032752 A * 3/2019
(Continued)

OTHER PUBLICATIONS

Extended European Search Report for European Patent Application No. 21204189.1 dated Mar. 14, 2022 (6 Pages).
(Continued)

*Primary Examiner* — Erin Kryukova
(74) *Attorney, Agent, or Firm* — Eversheds Sutherland (US) LLP

(57) ABSTRACT

Illumination device (10) for a motor vehicle headlamp for generating a low beam, wherein a vertical extension of the low beam extends along a VV-line from at least 0° down to at least −10° on the VV-line, said illumination device (10) comprises: —an optic body (100) comprising a common light input section (110), a light output section (130) and a shell surface (140) limiting the optic body (100), —a projection lens system (200) configured to project the light-rays in front of the illumination device (10), wherein the projection lens system (200) in combination with the optic body (100) are configured to generate the low beam illuminated by the projection lens system (200), wherein the optic body (100) comprises a first set of optically operative surfaces for
(Continued)

Figure 1:
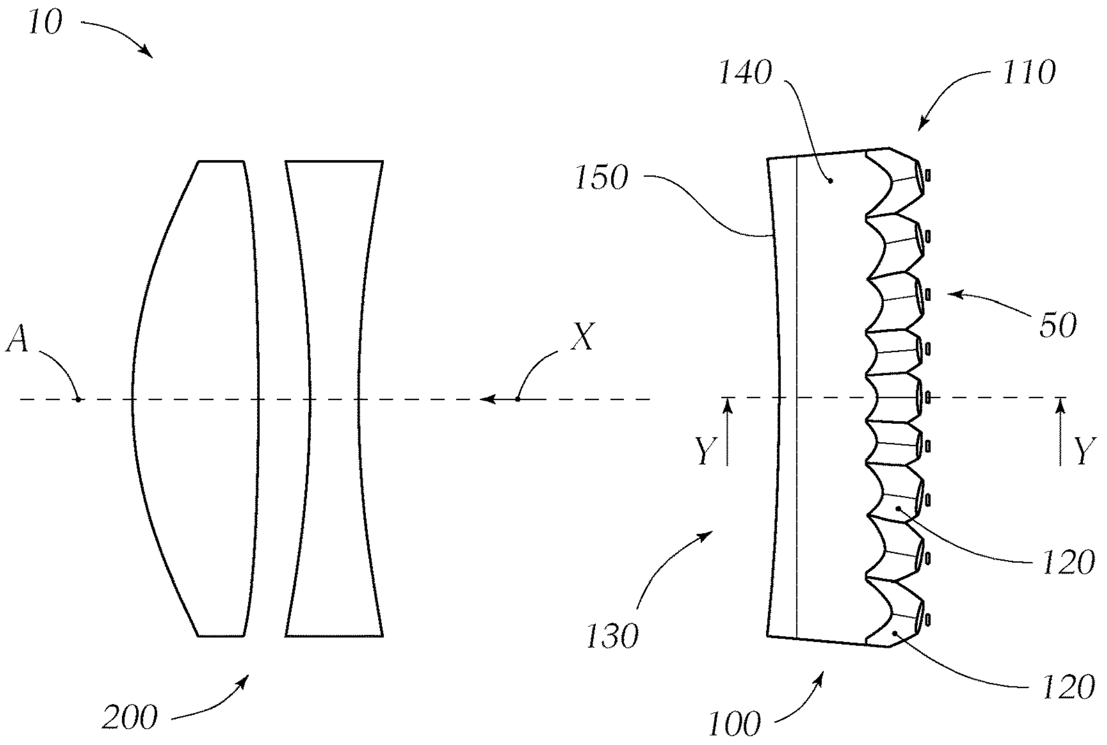

guiding light-rays along a first light-ray path (LR1), wherein the first set of operative surfaces comprises a first and second light deflection surface (300*a*, 300*b*), and a first light exit surface (300*c*), wherein the first and second light deflection surfaces (300*a*, 300*b*) are arranged on the shell surface (140), and wherein the first light exit surface (300*c*) is arranged on the light output section (130), wherein light rays following the first light-ray path (LR1) are incident on the first deflection surface (300*a*) and are deflected to the second deflection surface (300*b*), and wherein light-rays incident on the second deflection surface (300*b*) are deflected to the first light exit surface (300*c*), and wherein light-rays emitted by the first light exit surface (300*c*) contribute to generate a first part of the low beam, and wherein the optic body (100) comprises a second set of optically operative surfaces for guiding light-rays along a second and a third light-ray path (LR2, LR3), wherein the second set of optically operative surfaces comprises a third deflection surface (400*a*) and a second light exit surface (400*b*), wherein the third deflection surface (400*a*) is arranged on the shell surface (140) and the second light exit surface (400*b*) is arranged on the light output section (130) separate from the first light exit surface (300*c*), wherein light-rays following the second light-ray path (LR2) are incident on the third deflection surface (400*a*) and are deflected to the second light exit surface (400*b*) for coupling out of the optic body (100), and wherein light rays following the third light-ray path (LR3) are incident on the second light exit surface (400*b*) directly from the common light input section (110), wherein light-rays emitted by the second light exit surface (400*b*) contribute to generate a second part of the low beam.

14 Claims, 3 Drawing Sheets

(51) Int. Cl.

| | |
|---|---|
| ***F21S 41/151*** | (2018.01) |
| ***F21S 41/20*** | (2018.01) |
| ***F21S 41/24*** | (2018.01) |
| ***F21S 41/32*** | (2018.01) |
| ***F21W 102/135*** | (2018.01) |
| ***F21Y 115/10*** | (2016.01) |

(52) U.S. Cl.
CPC ........... *F21S 41/285* (2018.01); *F21S 41/322* (2018.01); *F21W 2102/135* (2018.01); *F21Y 2115/10* (2016.08)

(58) Field of Classification Search
CPC .. F21S 41/25; F21S 41/147; F21W 2102/135; F21Y 2115/10
See application file for complete search history.

(56) References Cited

U.S. PATENT DOCUMENTS

| | | | | |
|---|---|---|---|---|
| 2021/0317965 | A1 | 10/2021 | Kronberger et al. | |
| 2022/0186902 | A1* | 6/2022 | Lim | F21S 41/27 |
| 2023/0050282 | A1* | 2/2023 | Mun | F21S 41/143 |
| 2023/0258309 | A1* | 8/2023 | Suwa | F21S 41/24 362/475 |

FOREIGN PATENT DOCUMENTS

| | | | | |
|---|---|---|---|---|
| KR | 20190036807 | A * | 4/2019 | |
| WO | 2016162921 | A1 | 10/2016 | |
| WO | WO-2020126031 | A1 * | 6/2020 | B60Q 1/2607 |
| WO | WO-2022001087 | A1 * | 1/2022 | F21S 41/147 |

OTHER PUBLICATIONS

Search Report and Written Opinion for International Patent Application No. PCT/EP2022/078396 dated Jan. 25, 2023 (12 Pages).

* cited by examiner

ILLUMINATION DEVICE FOR A VEHICLE HEADLAMP

The invention relates to an illumination device for a motor vehicle headlamp for generating a low beam, wherein a vertical extension of the low beam extends along a V-V line from at least 0° down to lower −10° on the V-V line, said illumination device comprises:

at least one light source configured to emit light-rays in different light-ray paths, an optic body comprising a common light input section for coupling light-rays from the at least one light source into the optic body, said light input section having at least one light collecting element, which is assigned to a respective light source and is configured to couple light rays from the assigned light source into the optic body, a light output section for decoupling light-rays that are coupled into the optic body via the common light input section, out of the optic body in a main direction of the illumination device, a shell surface limiting the optic body, said shell surface is configured to deflect light rays coupled into the optic body, which shell surface extends between the common light input section and the light output section, a projection lens system, comprising at least one lens, arranged downstream of the optic body along the main direction in order to receive light-rays emitted from light output section of the optic body, wherein the projection lens system is configured to project the light-rays in front of the illumination device, wherein the projection lens system in combination with the at least one light source and the optic body are configured to generate the low beam illuminated by the projection lens system.

Further, the invention relates to a motor vehicle headlamp comprising at least one illumination device according to the invention.

In some cases, especially when a high resolution high beam and/or high resolution low beam is required for a vehicle headlamp, the construction of the corresponding illumination device demands certain requirements that results sometimes in not fulfilling legal requirements on a low beam (see for example in Official Journal of the EU L 250/92 Aug. 8, 2014).

To fulfill also the requirements for the low beam in view of illumination intensity values and the demanded spatial illumination on a road, an enhanced illumination device is required.

It is an object of the invention to provide an enhanced illumination device.

To achieve this object, the optic body comprises a first set of optically operative surfaces for guiding at least a part of the light rays coupled into the optic body via the common light input section along a first light-ray path from the common light input section to the light output section, wherein the first set of operative surfaces comprises a first and second light deflection surface, and a first light exit surface, wherein the first and second light deflection surfaces are arranged on the shell surface, and wherein the first light exit surface is arranged on the light output section, wherein light rays following the first light-ray path are incident on the first deflection surface and are deflected to the second deflection surface, and wherein light-rays incident on the second deflection surface are deflected to the first light exit surface for coupling out of the optic body, and wherein light-rays emitted by the first light exit surface contribute to generate a first part of the low beam, and wherein the optic body comprises a second set of optically operative surfaces for guiding at least a part of light-rays coupled into the optic body via the common light input section along a second and a third light-ray path from the common light input section to the light output section, wherein the second set of optically operative surfaces comprises a third deflection surface and a second light exit surface, wherein the third deflection surface is arranged on the shell surface and the second light exit surface is arranged on the light output section separate from the first light exit surface, wherein light-rays following the second light-ray path are incident on the third deflection surface and are deflected to the second light exit surface for coupling out of the optic body, and wherein light rays following the third light-ray path are incident on the second light exit surface directly from the common light input section, and wherein light-rays emitted by the second light exit surface contribute to generate a second part of the low beam, wherein the first part of the low beam contributed by the first light exit surface and the second part of the low beam contributed by the second light exit surface form a low beam, wherein the vertical extension of the low beam extends along the V-V line from at least 0° down to lower −10° on the V-V line.

Advantageously, light-rays are deflected on the first, second and the third deflection surface by a total internal reflection.

Advantageously, the second deflection surface and the third deflection surface are connected via a convex connection surface.

Advantageously, the projection lens system comprises an optical axis, wherein the first light exit surface having a surface vector, said surface vector is inclined to the optical axis of the projection lens system.

Advantageously, the second light exit surface having a surface vector, said surface vector is inclined to the optical axis of the projection lens system.

Advantageously, the light collecting element is built as a collimating optics.

Advantageously, the light collecting element comprises:

a first lens with an optical axis, wherein the first lens is configured to direct light incident on the first lens onto the first light-ray path, and a second lens with an optical axis, wherein the second lens is configured to direct light incident on the second lens onto the third light ray path, wherein the first and second lenses are arranged directly next to each other in a way that their optical axes having an offset to each other in a horizontal plane and/or in a vertical plane.

The collimator optics receives the light from the light source, wherein different alignment or direction of the two lenses (or two refractive surfaces of the collimator optics) results in two different light ray paths.

Advantageously, the optical axes of the first and second lens of the light collecting element are pivoted to each other around an axis orthogonal to the main direction.

Advantageously, the light collecting element is built as a Compound Parabolic Concentrator, preferably a non-imaging Compound Parabolic Concentrator.

Advantageously, the first light exit surface and the shell surface intersect in a common surface section line, said common surface section line builds the asymmetric cut-off boundary for the low beam.

Advantageously, the projection lens system comprises an optical axis and at least one focal point arranged on the optical axis, and wherein the common surface section line is arranged in the at least one focal point Advantageously, the common light input section and light output section having an offset to each other along the main direction.

Advantageously, the illumination device comprises at least two light sources, wherein the light sources are arranged in a horizontal line substantially orthogonal to the main direction.

Advantageously, the at least one light source is a LED.

The object can also be achieved by a motor vehicle headlamp comprising at least one illumination device according to the invention.

Figure 2:
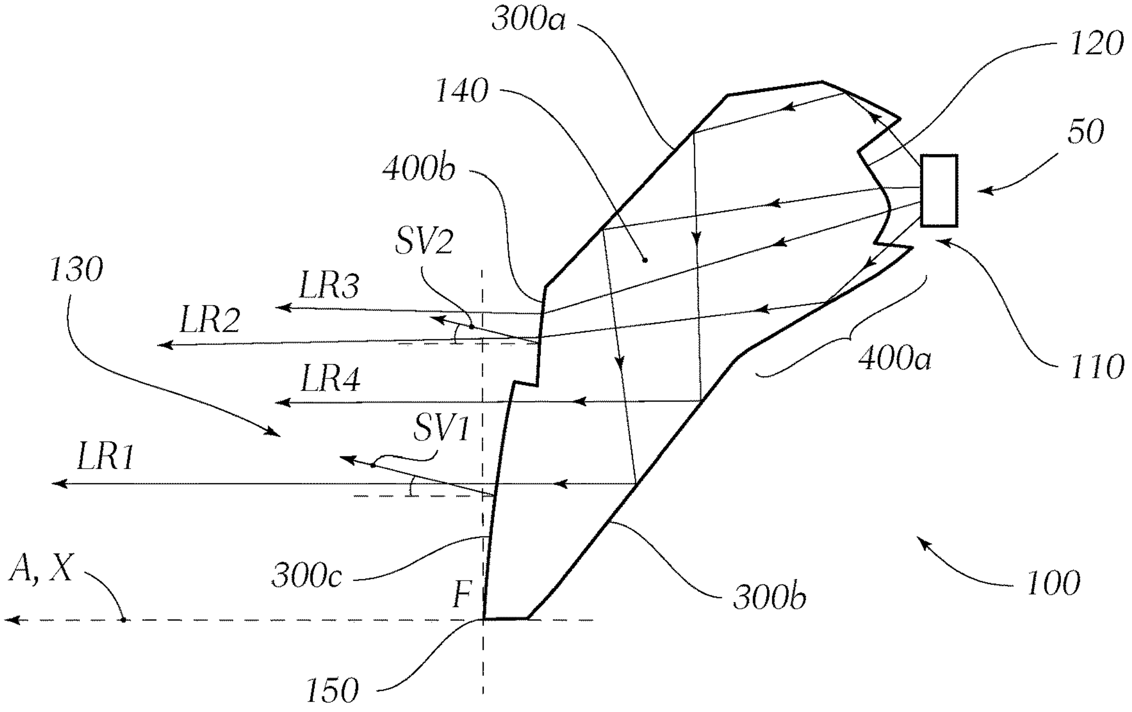
Figure 3:
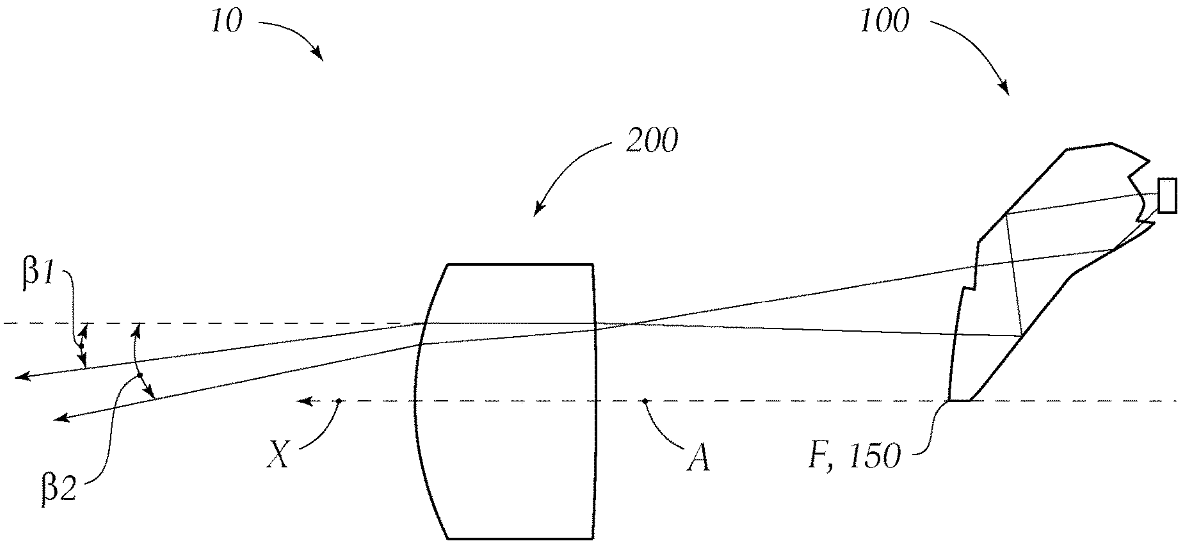
Figure 4:
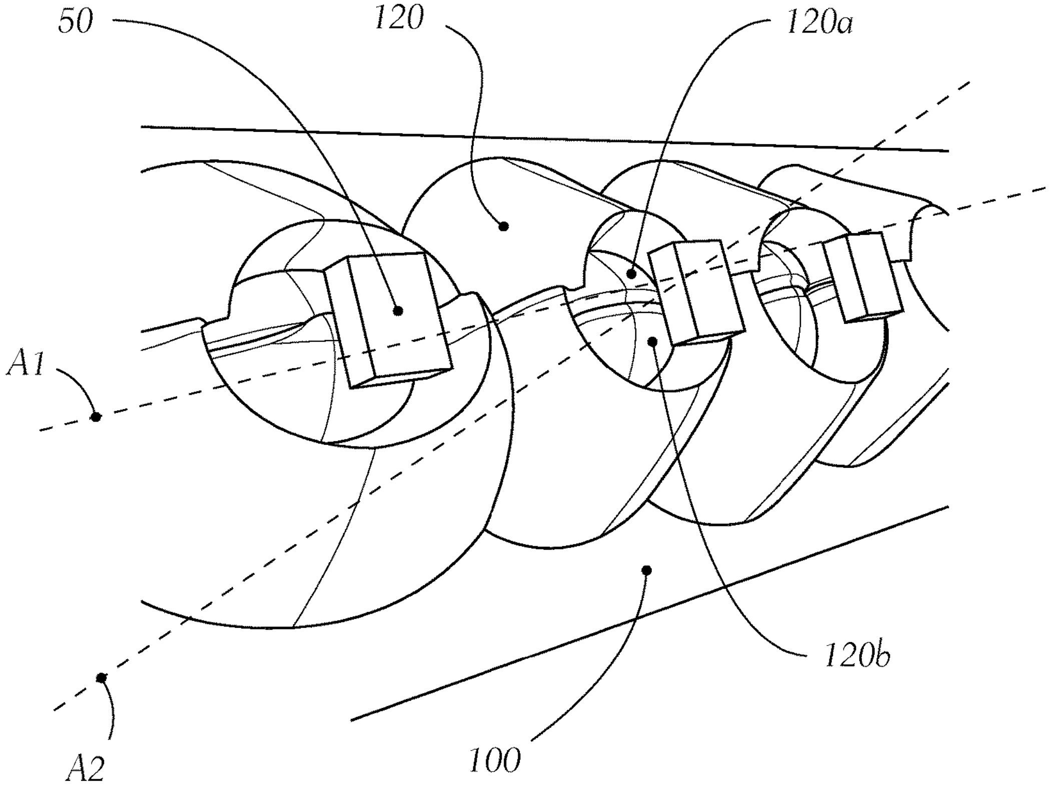
Figure 5:
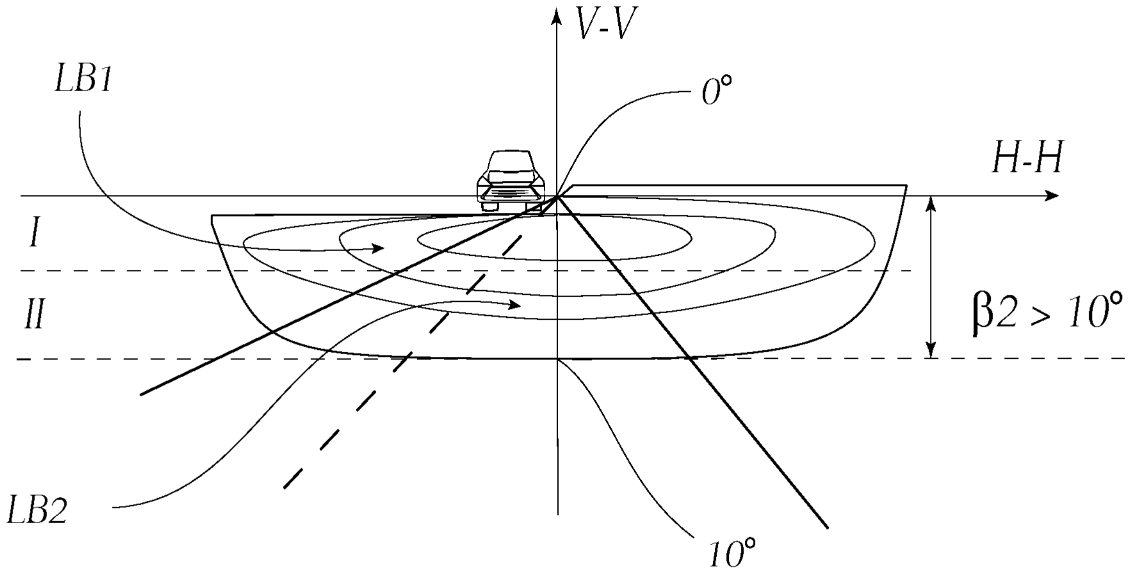

In the following, in order to further demonstrate the present invention, illustrative and non-restrictive embodiments are discussed, as shown in the drawings, which show:

FIG. 1 a top view of an example of an illumination device for generating a low beam, wherein the illumination device comprises an optic body with light sources, and a projection lens system for project light rays receiving from the optic body in front of the illumination device, FIG. 2 a cross-section view along the line Y-Y of the optic body in FIG. 1, wherein the optic body comprises a common light input section for coupling light-rays of the light sources into the optic body, a light output section for decoupling light-rays out of the optic body in a main direction, FIG. 3 a cross-section view of the whole illumination device of FIG. 1, FIG. 4 a perspective view of the common light input section, wherein the common light input section comprises a plurality of light collecting elements, each comprising a first and a second lens, and FIG. 5 an exemplary low beam generated by the illumination device of FIG. 1, wherein the low beam extends along the V-V line from 0° down to at least −10° on the V-V line.

FIG. 1 shows an illumination device 10 for a motor vehicle headlamp for generating a low beam, wherein a vertical extension of the low beam extends along a V-V line from at least 0° down to at least −10° on the V-V line, which low beam is shown in detail in FIG. 5.

The illumination device 10 comprises a plurality of light sources 50 configured to emit light-rays in different light-ray paths, wherein the plurality of light sources 50 are built as LEDs in the shown example. Also, the light sources 50 are arranged in a horizontal line substantially orthogonal to the main direction X.

Further, the illumination device 10 comprises an optic body 100, which is shown in FIG. 2 in a cross section along the line Y-Y indicated in FIG. 1. The optic body 100 comprises a common light input section 110 for coupling light-rays from the light sources 50 into the optic body 100, said light input section 110 having a plurality of light collecting elements 120, which are each assigned to a respective light source 50 and are configured to couple light rays from the assigned light source 50 into the optic body 100, and wherein the light collecting elements 120 are built as a collimating optics, wherein the light collecting elements 120 can also be built as a Compound Parabolic Concentrator, preferably a non-imaging Compound Parabolic Concentrator.

Further, the optic body 100 comprises a light output section 130 for decoupling light-rays that are coupled into the optic body 100 via the common light input section 110, out of the optic body 100 in a main direction X of the illumination device 10, and a shell surface 140 limiting the optic body 100, said shell surface 140 is configured to deflect light rays coupled into the optic body 100, which shell surface 140 extends between the common light input section 110 and the light output section 130.

The common light input section 110 and light output section 130 having an offset to each other along the main direction X and along an axis orthogonal to the main direction X.

The illumination device 10 further comprises a projection lens system 200, comprising at least one lens (and in the shown example in the figures the projection lens system 200 comprises two lenses), arranged downstream of the optic body 100 along the main direction X in order to receive light-rays emitted from light output section 130 of the optic body 100, wherein the projection lens system 200 is configured to project the light-rays in front of the illumination device 10, wherein the projection lens system 200 in combination with the at least one light source 50 and the optic body 100 are configured to generate the low beam light distribution illuminated by the projection lens system 200.

With regard to FIG. 2, the optic body 100 comprises a first set of optically operative surfaces for guiding at least a part of the light-rays coupled into the optic body 100 via the common light input section 110 along a first light-ray path LR1 from the common light input section 110 to the light output section 130, The first set of operative surfaces comprises a first and second light deflection surface 300*a*, 300*b*, and a first light exit surface 300*c*, wherein the first and second light deflection surfaces 300*a*, 300*b* are arranged on the shell surface 140, and wherein the first light exit surface 300*c* is arranged on the light output section 130.

Light rays following the first light-ray path LR1 are incident on the first deflection surface 300*a* and are deflected to the second deflection surface 300*b*, and wherein light-rays incident on the second deflection surface 300*b* are deflected to the first light exit surface 300*c* for coupling out the light of the optic body 100, wherein light-rays emitted by the first light exit surface 300*c* contribute to generate a first part of the low beam LB1, which is shown in FIG. 5.

The optic body 100 further comprises a second set of optically operative surfaces for guiding at least a part of light-rays coupled into the optic body 100 via the common light input section 110 along a second and a third light-ray path LR2, LR3 from the common light input section 110 to the light output section 130.

The second set of optically operative surfaces comprises a third deflection surface 400*a* and a second light exit surface 400*b*, wherein the third deflection surface 400*a* is arranged on the shell surface 140 and the second light exit surface 400*b* is arranged on the light output section 130 separate from the first light exit surface 300*c*.

Light-rays following the second light-ray path LR2 are incident on the third deflection surface 400*a* and are deflected to the second light exit surface 400*b* for coupling out of the optic body 100, and wherein light rays following the third light-ray path LR3 are incident on the second light exit surface 400*b* directly from the common light input section 110, wherein light-rays emitted by the second light exit surface 400*b* contribute to generate a second part of the low beam LB2, also shown in FIG. 5.

The first part of the low beam LB1 contributed by the first light exit surface 300*c* and the second part of the low beam LB2 contributed by the second light exit surface 400*b* form a low beam, wherein the vertical extension of the low beam extends along the V-V linefrom at least 0° down to at least −10° on the V-V line.

As can be also seen in FIG. 2, the second deflection surface 300*b* and the third deflection surface 400*a* are connected via a convex connection surface of the shell surface 140.

Further, the first light exit surface 300*c* and the shell surface 140 intersect in a common surface section line 150, said common surface section line 150 builds the asymmetric cut-off boundary for the low beam light distribution, wherein the projection lens system 200 comprises an optical axis A and at least one focal point F arranged on the optical axis A, and wherein the common surface section line 150 is arranged in the at least one focal point F, as can be seen in FIG. 2.

The first light exit surface 300*c* of the optic body 100 having a surface vector SV1, said surface vector SV1 is inclined to the optical axis A of the projection lens system 200, so that the first light exit surface 300*c* is inclined, wherein the surface vector SV1 of the first light exit surface 300 is—seen in a correctly installed state of the illumination device 10 in a vehicle headlamp or vehicle—inclined upward.

Also, the second light exit surface 400*b* having a surface vector SV2, said surface vector SV2 is inclined to the optical axis A of the projection lens system 200, so that the second light exit surface 400*b* is inclined, wherein the surface vector SV2 of the second light exit surface 400*b* is—seen in a correctly installed state of the illumination device 10 in a vehicle headlamp or vehicle—inclined upward.

FIG. 3 shows another exemplary illumination device 10 with the identical optic body 100 discussed and described above, but with a projection lens system 200 comprising exactly one lens. Also, the cut-off line lies within the optical axis A of the projection lens system 200.

Further, as can be seen in FIG. 2 and FIG. 3, the first light exit surface 300*c* of the optic body 100 is inclined backwards or against the main direction X of the illumination device 10.

Further, FIG. 3 shows in a schematic way, that light-rays emitted by the first light exit surface 300*c* contribute to generate the first part of the low beam LB1, wherein the first part of the low beam LB1 extends starting from the H-H line, which starts at an angle of 0° along the V-V line, down to an angle β1 on the V-V line, wherein the angle β1 in the shown example is from 8° to 8.5°.

Moreover, light-rays emitted by the second light exit surface 400*b* contribute to generate the second part of the low beam LB2, wherein the first and second part of the low beam LB1, LB2 together extends down to an angle β2 on the V-V line, wherein the angle β2 in the shown example is at least −10° starting from 0°, the position of the V-V line or the intersection point of the V-V line with the H-H line.

FIG. 4 shows a perspective back view of the optic body 100, wherein the light collecting elements are shown in a further detail. Each light collecting element 120 comprises a first lens 120*a* with an optical axis A1, wherein the first lens 120*a* is configured to direct light incident on the first lens 120*a* onto the first light ray path LR1, and a second lens 120*b* with an optical axis A2, wherein the second lens 120*b* is configured to direct light incident on the second lens 120*b* onto the third light ray path LR3.

The first and second lenses 120*a*, 120*b* are arranged directly next to each other in a way that their optical axes A1, A2 having an offset to each other in a horizontal direction and/or in a vertical direction.

The terms "up", "down", "vertical", "horizontal", "forward", "front", "backward" and "back" are to be understood from an illumination device in a correctly installed state in a vehicle headlamp or in a vehicle.

The optical axes A1, A2 of the first and second lens 120*a*, 120*b* of each light collecting element 120 in the shown example in the figures are pivoted to each other around an axis orthogonal to the main direction X.

Also, the first and second lenses 120*a*, 120*b* of each light collecting element 120 has a central lens-like surface and total-reflecting surfaces at the periphery.

FIG. 5 shows the low beam light distribution generated by the illumination device 10 of the aforementioned examples in the figures. The low beam light distribution comprises a first part of the low beam LB1 and a second part of the low beam LB2, wherein the vertical extension of the low beam light distribution extends along the V-V line from 0° down to at least −10° on the V-V line, wherein the angle β2 mentioned in regard with FIG. 3 corresponds also to FIG. 5.

The invention claimed is:

1. An illumination device (10) for a motor vehicle headlamp for generating a low beam, wherein a vertical extension of the low beam extends along a V-V line from at least 0° down to at least −10° on the V-V line, said illumination device (10) comprising:

at least one light source (50) configured to emit light-rays in different light-ray paths;

an optic body (100) which comprises:

a common light input section (110) for coupling light-rays from the at least one light source (50) into the optic body (100), said light input section (110) having at least one light collecting element (120), which is assigned to a respective light source (50) and is configured to couple light rays from the assigned light source (50) into the optic body (100), a light output section (130) for decoupling light-rays that are coupled into the optic body (100) via the common light input section (110), out of the optic body (100) in a main direction (X) of the illumination device (10), and a shell surface (140) limiting the optic body (100), said shell surface (140) is configured to deflect light rays coupled into the optic body (100), which shell surface (140) extends between the common light input section (110) and the light output section (130); and a projection lens system (200), comprising at least one lens, arranged downstream of the optic body (100) along the main direction (X) in order to receive light-rays emitted from light output section (130) of the optic body (100), wherein the projection lens system (200) is configured to project the light-rays in front of the illumination device (10), wherein the projection lens system (200) in combination with the at least one light source (50) and the optic body (100) are configured to generate the low beam illuminated by the projection lens system (200), wherein the optic body (100) comprises a first set of optically operative surfaces for guiding at least a part of the light-rays coupled into the optic body (100) via the common light input section (110) along a first light-ray path (LR1) from the common light input section (110) to the light output section (130), wherein the first set of operative surfaces comprises a first and second light deflection surface (300*a*, 300*b*), and a first light exit surface (300*c*), wherein the first and second light deflection surfaces (300*a*, 300*b*) are arranged on the shell surface (140), and wherein the first light exit surface (300*c*) is arranged on the light output section (130), wherein light rays following the first light-ray path (LR1) are incident on the first deflection surface (300*a*) and are deflected to the second deflection surface (300*b*), and wherein light-rays incident on the second deflection surface (300*b*) are deflected to the first light exit surface (300*c*) for coupling out of the optic body (100), wherein light-rays emitted by the first light exit surface (300*c*) contribute to generate a first part of the low beam, wherein the optic body (100) comprises a second set of optically operative surfaces for guiding at least a part of light-rays coupled into the optic body (100) via the common light input section (110) along a second and a third light-ray path (LR2, LR3) from the common light input section (110) to the light output section (130), wherein the second set of optically operative surfaces comprises a third deflection surface (400*a*) and a second light exit surface (400*b*), wherein the third deflection surface (400*a*) is arranged on the shell surface (140) and the second light exit surface (400*b*) is arranged on the light output section (130) separate from the first light exit surface (300*c*), wherein light-rays following the second light-ray path (LR2) are incident on the third deflection surface (400*a*) and are deflected to the second light exit surface (400*b*) for coupling out of the optic body (100), and wherein light rays following the third light-ray path (LR3) are incident on the second light exit surface (400*b*) directly from the common light input section (110), wherein light-rays emitted by the second light exit surface (400*b*) contribute to generate a second part of the low beam, wherein the first part of the low beam contributed by the first light exit surface (300*c*) and the second part of the low beam contributed by the second light exit surface (400*b*) form a low beam, wherein the vertical extension of the low beam extends along the V-V line from at least 0° down to lower −10° on the V-V line, and wherein the first light exit surface (300*c*) and the shell surface (140) intersect in a common surface section line (150), which builds an asymmetric cut-off boundary for the low beam.

2. The illumination device according to claim 1, wherein the second deflection surface (300*b*) and the third deflection surface (400*a*) are connected via a convex connection surface.

3. The illumination device according to claim 1, wherein the projection lens system (200) comprises an optical axis (A), wherein the first light exit surface (300*c*) has a surface vector, which is inclined to the optical axis (A) of the projection lens system (200).

4. The illumination device according to claim 3, wherein the second light exit surface (400*b*) has a surface vector, which is inclined to the optical axis (A) of the projection lens system (200).

5. The illumination device according to claim 1, wherein the light collecting element (120) is built as collimating optics.

6. The illumination device according to claim 1, wherein the light collecting element (120) comprises:

a first lens (120*a*) with an optical axis (A1), wherein the first lens (120*a*) is configured to direct light incident on the first lens (120*a*) onto the first light ray path (LR1), and a second lens (120*b*) with an optical axis (A2), wherein the second lens (120*b*) is configured to direct light incident on the second lens (120*b*) onto the third light ray path (LR3), wherein the first and second lenses (120*a*, 120*b*) are arranged directly next to each other in a way that their optical axes (A1, A2) have an offset to each other in a horizontal direction and/or in a vertical direction.

7. The illumination device according to claim 6, wherein the optical axes (A1, A2) of the first and second lens (120*a*, 120*b*) of the light collecting element (120) are pivoted to each other around an axis orthogonal to the main direction (X).

8. The illumination device according to claim 1, wherein the light collecting element (120) is built as a Compound Parabolic Concentrator.

9. The illumination device according to claim 8, wherein the Compound Parabolic Concentrator is a non-imaging Compound Parabolic Concentrator.

10. The illumination device according to claim 1, wherein the projection lens system (200) comprises an optical axis (A) and at least one focal point (F) arranged on the optical axis (A), and wherein the common surface section line (150) is arranged in the at least one focal point (F).

11. The illumination device according to claim 1, wherein the common light input section (110) and light output section (130) have an offset to each other along the main direction (X).

12. The illumination device according to claim 1, wherein the illumination device (10) comprises at least two light sources (50), wherein the light sources (50) are arranged in a horizontal line substantially orthogonal to the main direction (X).

13. The illumination device according to claim 1, wherein the at least one light source (50) is a LED.

14. A motor vehicle headlamp comprising at least one illumination device (10) according to claim 1.

* * * * *